United States Patent [19]

Ruf

[11] 4,334,698
[45] Jun. 15, 1982

[54] REAR AXLE SUSPENSION FOR AUTOMOTIVE VEHICLES

[75] Inventor: Gebhard Ruf, Weissach, Fed. Rep. of Germany

[73] Assignee: Dr. Ing. h.c.F. Porsche Aktiengesellschaft, Stuttgart, Fed. Rep. of Germany

[21] Appl. No.: 138,093

[22] Filed: Apr. 7, 1980

[30] Foreign Application Priority Data

Apr. 5, 1979 [DE] Fed. Rep. of Germany ....... 2913651

[51] Int. Cl.³ .............................................. B60G 3/00
[52] U.S. Cl. .................................. 280/690; 267/21 A; 267/63 A; 280/716
[58] Field of Search .................. 280/690, 716, 717; 267/63 R, 63 A, 21 R, 21 A, 30, 33, 35; 403/220, 225, 228, 221, 291

[56] References Cited

U.S. PATENT DOCUMENTS

| | | | |
|---|---|---|---|
| 2,147,518 | 2/1939 | Boxan | 267/21 A |
| 2,716,040 | 8/1955 | Barenyi | 267/21 R |
| 2,723,870 | 11/1955 | Page | 280/717 |
| 3,201,142 | 8/1965 | Dangauthier | 280/696 |
| 3,467,421 | 9/1969 | Bentley | 267/63 R |
| 3,822,893 | 7/1974 | Huber | 280/716 |
| 3,850,418 | 11/1974 | Hipsher | 267/63 R |
| 4,157,227 | 6/1979 | Hahle | 403/228 |

FOREIGN PATENT DOCUMENTS

| | | | |
|---|---|---|---|
| 2818198 | 10/1979 | Fed. Rep. of Germany | 280/690 |
| 276063 | 10/1964 | Netherlands | 280/690 |

*Primary Examiner*—Joseph F. Peters, Jr.
*Assistant Examiner*—John A. Carroll
*Attorney, Agent, or Firm*—Craig and Antonelli

[57] ABSTRACT

A rear axle suspension for an automotive vehicle has a driven rear axle which is guidably suspended by at least one control arm at each end of the axle and an elastic joint for interconnecting one end of each control arm with the vehicle body in a manner permitting the opposite end of the control arm to be displaced upwardly and downwardly with like movements of a respective end of the axle suspended thereby. Each respective interconnected joint and control arm is constructed and arranged with respect to each other for producing a more resilient suspension of the axle in the longitudinal direction of the vehicle when the opposite end of the control arm is deflected downwardly than when the opposite end is deflected upwardly with respect to a neutral position thereof. In accordance with preferred embodiments, the above-noted differing resiliencies can be achieved by the use of elastic joints that are more resilient along one axis than another, the control arms being shifted between positions more in alignment with one or the other of said axes or by shifting the control arm producing a deformation of the elastic joints that changes its degree of resiliency.

16 Claims, 10 Drawing Figures

REAR AXLE SUSPENSION FOR AUTOMOTIVE VEHICLES

BACKGROUND AND SUMMARY OF THE INVENTION

The invention relates to a rear axle suspension for automotive vehicles with a driven, rigid or semirigid rear axle supported by means of elastic joints on longitudinal control arms.

In a rear axle suspension for automotive vehicles with a driven rear axle supported with elastic joints on longitudinal control arms, the joints exhibit differing rigidities in the vertical extension and in the longitudinal direction (U.S. Pat. No. 2,989,330). To affect springing and damping, as well as to reduce vibration of the rear axle suspension, the joints are designed to be soft in the vertical direction and to be hard in the longitudinal direction for an exact guidance of the rear axle. However, an understeering [under control of the peripheral force] does not take place on the basis of this joint design.

It is an object of the invention to provide a rear axle suspension for automotive vehicles with a driven, rigid or semirigid rear axle wherein an undercontrol of the peripheral force is attained (i.e., during application of the brakes or during acceleration, a change in the toe-in results at the axle in a forward direction by means of a wider curve radius) solely by the construction of the elastic joints, by means of which the rear axle is guided on longitudinal control arms.

According to a preferred embodiment of the invention, this object is attained by the use of elastic joints that are constructed so as to be less resilient in the longitudinal direction of the vehicle when the wheel is in a downward (spring tensioned) deflected condition than when the wheel is in an upward (spring relaxed) deflected position.

Among the advantages attained in particular by the invention are that with constructionally simple means a change in the toe-in is obtained on the wheel on the outside of the curve in case of a braking force exerted by the engine brake or foot brake, by providing that the longitudinal control means on the inside of the curve yields rearwardly to a greater extent than the longitudinal control means on the outside of the curve.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
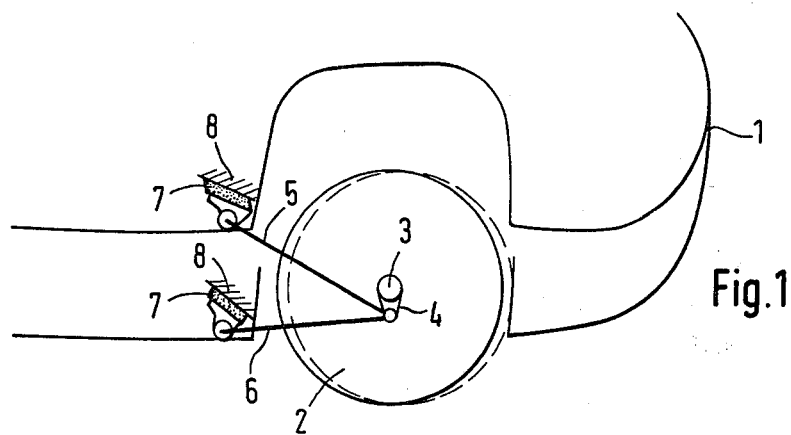
FIG. 1 is a schematic view of the rear axle suspension in a lateral representation showing upward and downward deflected positions to identify the action of the invention with joints mounted to the vehicle body.

In FIG. 1, the rear part of an automobile body is denoted by 1, and 2 denotes a rear wheel guided, together with another rear wheel, not shown, via a rigid or semirigid rear axle 3, a wheel carrier 4; longitudinal control arms 5 and 6 and elastic joints 7 are shown with the vehicle body 8 so as to illustrate upward body deflection at the wheel on the outside of a curve and downward body deflection at the wheel on the inside of the curve, the outside wheel connected to control rod 5 being shown in broken lines.

Figure 2:
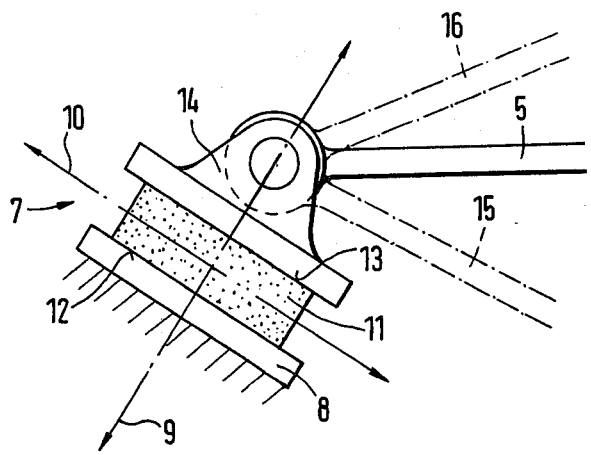
FIG. 2 shows the elastic joint of FIG. 1.

One joint 7 is shown in greater detail in FIG. 2 in cooperation with, for example, control arm 5. The joint 7 has two major axes of elasticity 9, 10 located inclined to a predetermined extent with respect to the vertical of the vehicle and comprises an elastic bearing plate 11, for example of rubber, firmly joined at one end face 12 with the vehicle body 8 and at the other end face 13 with a mounting plate 14 that is pivotably connected to the control arm 5. In the embodiment illustrated in FIG. 2, the control arm 5 is shown in its neutral position by solid lines; in the position corresponding with the upwardly deflected body position of FIG. 1 in dot-dash lines 15; and in the position corresponding with the downwardly deflected body position shown in FIG. 1 in dot-dash lines 16, of the major axes 9 and 10, the axis of elasticity 10 is the axis with the greater resilience. With the body being deflected downwardly, the joint 7 can thus yield less in the longitudinal direction than in case of a wheel at the side of the body which is deflected upwardly.

Figure 3:
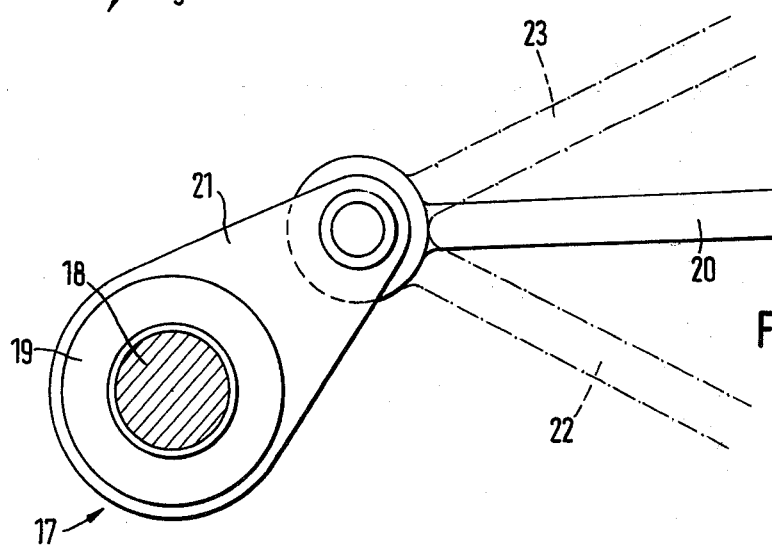
FIG. 3 shows another embodiment of a joint.

In FIG. 3, 17 denotes a joint constituted by an at least approximately cylindrical, elastic bearing 19 mounted to the vehicle body 18; the elasticity of this bearing can be influenced by a pitman arm 21 fixedly connected to this bearing and pivotably connected to the control arm 20, in dependence on the position of the control arm. In the embodiment illustrated in this figure, the control arm 20 is shown in its neutral position with respect to the wheel by solid lines; in the position with the body being deflected upwardly relative to the neutral position by the dot-dash lines 22; and in the position with the body being deflected downwardly relative to the neutral position, in dot-dash lines 23. The differing rigidity of this bearing is obtained by the rotational movement of the control arm with the use of stretched positions, whereby with the body being deflected downwardly the joint thus can yield less in the longitudinal direction than in case where the body is deflected upwardly.

Figure 4:
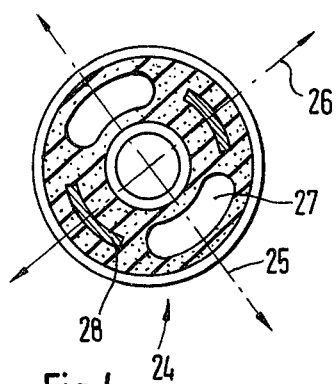
FIG. 4 shows a further embodiment of a joint.

In the embodiment of the invention shown in FIG. 4, 24 denotes a joint constituted by an elastic bearing, for example a rubber bearing, wherein the differing resiliency of the major axes of elasticity 25 and 26 is obtained by recesses 27 and by inserts 28 of a rigid material, for example steel inserts. The major axis of elasticity 25 in the axis with the greater resilience, so that the joint with the body being deflected downwardly can yield less in the longitudinal direction than in case when the body is deflected upwardly.

Figure 5:
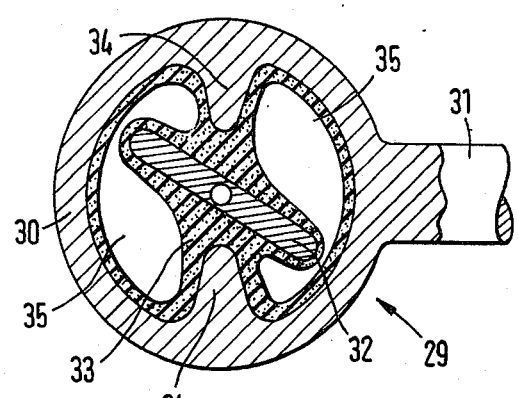
FIG. 5 shows still another embodiment of a joint in a neutral control arm position.
Figure 6:
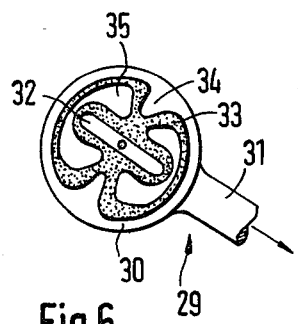
FIG. 6 shows the joint of FIG. 5 with the wheel under downward deflection.
Figure 7:
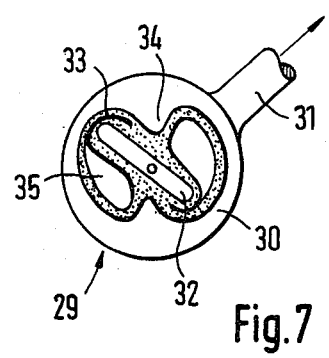
FIG. 7 shows the joint of FIG. 5 with the wheel under upward deflection.

In the embodiment of FIG. 5, the joint 29 comprises a supporting member 32 affixed to the vehicle and arranged within the hub 30 of the control arm 31; with respect to this supporting member, the control arm 31 is adjustable with the intermediary of an elastic part 33, for example a rubber part, which latter exhibits recesses 35 and is supported nonrotatably (i.e., without relative rotation displacement at its mounting interfaces) on the one hand on the supporting member 32 and on the other hand on integral lobes 34 of the hub 30 of the control arm 31. The adjustability of the control arm is such that the resiliency of the joint is affected in dependence on the position of the control arm 31. In FIG. 6, the joint 29 is shown with the body being deflected upwardly and can yield in the longitudinal direction to a greater extent that the joint 29 with the body being deflected downwardly as shown in FIG. 7.

Figure 8:
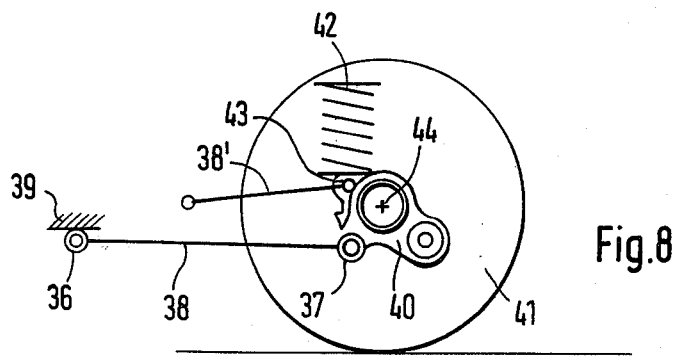
FIG. 8 shows an embodiment with spring-loaded joints on the automobile body and on the wheel carrier.

In the embodiment shown in FIG. 8, the joints are formed by at least approximately cylindrical, elastic bearings, for example of rubber, and are denoted 36 and 37; by means of these joints, a control arm 38 is articulated elastically to the vehicle body 39 and to the wheel carrier 40 of a wheel 41. A spring 42 is offset relative to the center 44 of the wheel in the longitudinal extension of the vehicle so that in the downwardly deflected condition a large twisting torque acts on the wheel carrier 40, which must be absorbed by a pair of longitudinal forces in the longitudinal control arms 38 and 38'. These longitudinal forces tension the elastic joints 36 and 37 in the downwardly deflected condition so that they cannot yield as much as when the body is deflected upwardly, and is due to a nonlinear characteristic in cases of a change of the peripheral force at the tire. As a result, when the body is deflected downwardly, the joints 36 and 37 are less resilient in the longitudinal direction than in the case where the body is deflected upwardly.

Figure 9:
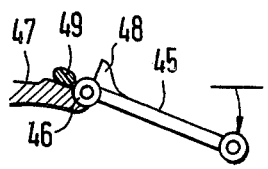
FIG. 9 shows a further embodiment with joints on the automobile body and on the wheel carrier with the wheel under downward deflection.
Figure 10:
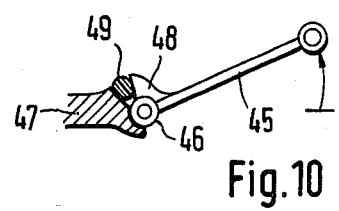
FIG. 10 shows an embodiment of FIG. 9 with the wheel under upward deflection.

FIGS. 9 and 10 show a control arm, denoted by 45, which is elastically articulated to the vehicle body 47 by means of a joint 46, which latter is formed by an at least approximately cylindrical, elastic bearing, for example of rubber. The control arm 45 has a toggle-lever-like lobe 48 in the zone of the bearing 46, by means of which an elastic element 49, e.g., a rubber element, is deformable in dependence on the position of the control arm, this element being arranged between the integral lobe 48 and the body 47. With the wheel being deflected upward (arrow in FIG. 10), the joint 46 thus can yield less in the longitudinal direction than in case of a downwardly deflected wheel (arrow in FIG. 9).

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Rear axle suspension for automotive vehicles with a driven rear axle guided on longitudinal control arms with elastic joints, characterized in that the elastic joints are arranged relative to said axles and control arms and are constructed in a manner creating a means for causing said suspension to be less resilient in a vehicle longitudinal direction when a vehicle body portion to which said joints are mounted is deflected downwardly relative to a neutral position and for causing said suspension to be more resilient in said vehicle longitudinal direction when the body portion is in an upwardly deflected position relative to said neutral position.

2. Rear axle suspension according to claim 1, wherein said rear axle is a rigid axle.

3. Rear axle suspension according to claim 1, wherein said rear axle is a semirigid axle.

4. Rear axle suspension according to claim 1, characterized in that the joints each comprise two major axes of elasticity lying obliquely to a vertical axis of the vehicle, said joints exhibiting differing resiliency along these axes.

5. Rear axle suspension according to claim 4, characterized in that each of the joints comprise elastic bearings in the form of at least one elastic bearing plate firmly joined at one end face to said vehicle body portion and at an opposite end face at a mounting plate pivotably connected to one of the control arms.

6. Rear axle suspension according to claim 4, characterized in that the joints comprise at least approximately cylindrical, elastic bearings supported on the vehicle body, the elasticity of said bearings being constructed so as to be influenced by the position of said longitudinal control arms by means of a pitman arm fixedly connected to said bearings and pivotably connected to the control arms.

7. Rear axle suspension according to claim 4, characterized in that the joints comprise elastic bearings, wherein the differing resiliency along the major axes of elasticity is obtained by recesses and by inserts of a rigid material in the elastic bearings.

8. Rear axle suspension according to claim 4, characterized in that the joints comprise a supporting member affixed to the vehicle and arranged within a hub of said control arms, the control arms being adjustable with respect to said supporting member, with the intermediary of an elastic element mounted, without relative rotation, on the supporting member and on integral lobes of the hub of the control arms, said elastic element having recesses which influence the resiliencies of the major axes of elasticity in dependence on the position of the control arms.

9. Rear axle suspension according to claim 8, wherein said elastic element is formed of rubber.

10. Rear axle suspension according to claim 1, characterized in that the joints comprise at least approximately cylindrical, elastic bearings by means of which each longitudinal control arm is elastically articulated to said vehicle body portion and to a wheel carrier, said elastic bearings being acted upon by the action of at least one compression spring by said spring acting upon an integral lobe of a respective wheel carrier in front of the wheel center of an associated wheel, with respect to a forward vehicle direction, and the force of said spring being affected in dependence on the position of said longitudinal control arms.

11. Rear suspension according to claims 5 or 6 or 7 or 10, wherein said elastic bearings are formed of rubber.

12. Rear axle suspension according to claim 10, characterized in that the control arms have, in the vicinity of each respective elastic bearing, toggle-lever-like integral lobes by means of which elastic elements that are arranged between the toggle-lever-like integral lobes and the vehicle body portion are deformable in dependence on the position of the control arms.

13. Rear suspension according to claim 12, wherein said elastic elements are formed of rubber.

14. Rear axle suspension of an automotive vehicle comprising:
(a) a driven rear axle;
(b) at least one control arm for guidably suspending each end of said axle from a vehicle body; and
(c) an elastic joint for interconnecting one end of each control arm with said vehicle body in a manner permitting the opposite end of the control arm to be displaced upwardly and downwardly with like movements of a respective end of the axle suspended thereby, wherein each respective interconnected joint and control arm is constructed and arranged with respect to each other so as to constitute a means for producing a more resilient suspension of said axle in the longitudinal direction of said vehicle relative to a neutral position when said opposite end is deflected downwardly and a less resilient suspension of said axle in said longitudinal direction when said opposite end is deflected upwardly with respect to said neutral position thereof.

15. Rear axle according to claim 13, wherein each elastic joint is constructed so as to have greater elasticity in a first direction than a second direction, said control arms being arranged so as to swing between positions closer to alignment with said first direction or said second direction with downward and upward movements of each opposite end, respectively.

16. Rear axle according to claim 13, wherein each elastic joint is constructed so as to have greater elasticity in an undeformed configuration than in a deformed configuration, each control arm being operable to shift a respective elastic joint between said undeformed and deformed configurations when its opposite end is shifted downwardly and upwardly, respectively.

* * * * *